US011887313B2

(12) United States Patent
Sanderson et al.

(10) Patent No.: US 11,887,313 B2
(45) Date of Patent: Jan. 30, 2024

(54) COMPUTING PLATFORM USING MACHINE LEARNING FOR FOREGROUND MASK ESTIMATION

(71) Applicant: SplitmediaLabs Limited, Kwun Tong (HK)

(72) Inventors: Hugh Ross Sanderson, Shenton Park (AU); Henrik Levring, Manila (PH); Julien Charles Flack, Swanbourne (AU)

(73) Assignee: SplitmediaLabs Limited, Kwun Tong (HK)

( * ) Notice: Subject to any disclaimer, the term of this patent is extended or adjusted under 35 U.S.C. 154(b) by 0 days.

(21) Appl. No.: 18/247,308

(22) PCT Filed: Sep. 26, 2021

(86) PCT No.: PCT/CN2021/120724
§ 371 (c)(1),
(2) Date: Mar. 30, 2023

(87) PCT Pub. No.: WO2022/068735
PCT Pub. Date: Apr. 7, 2022

(65) Prior Publication Data
US 2023/0267620 A1    Aug. 24, 2023

Related U.S. Application Data

(60) Provisional application No. 63/085,285, filed on Sep. 30, 2020.

(51) Int. Cl.
*G06T 7/194*    (2017.01)
*G06V 20/40*    (2022.01)
(Continued)

(52) U.S. Cl.
CPC ............ *G06T 7/194* (2017.01); *G06V 10/774* (2022.01); *G06V 10/82* (2022.01); *G06V 20/49* (2022.01);
(Continued)

(58) Field of Classification Search
None
See application file for complete search history.

(56) References Cited

U.S. PATENT DOCUMENTS

2007/0133880 A1    6/2007  Sun et al.
2008/0285859 A1    11/2008 Lei et al.
(Continued)

FOREIGN PATENT DOCUMENTS

WO    2014022170 A1    2/2014

OTHER PUBLICATIONS

Babaee, Mohammadreza, Duc Tung Dinh, and Gerhard Rigoll. "A deep convolutional neural network for video sequence background subtraction." Pattern Recognition 76 (2018): 635-649. (Year: 2018).*
(Continued)

*Primary Examiner* — Sean M Conner
(74) *Attorney, Agent, or Firm* — Banner & Witcoff, Ltd.

(57) ABSTRACT

Aspects of the disclosure relate to using machine learning for foreground mask estimation. A computing platform may receive a set of images and corresponding ground truth foreground masks. Using the set of images and the corresponding ground truth foreground masks, the computing platform may train the first neural network to distinguish between image foregrounds and backgrounds, which may result in a first set of foreground masks. For each image and based on a corresponding foreground mask, the computing platform may estimate a first background clean plate. Using the set of images, the first background clean plates, and a set of corresponding ground truth mask images, the computing
(Continued)

platform may train a second neural network, which may configure the second neural network to output foreground masks based on video input information. The computing platform may deploy, to an implementation computing device, the second neural network.

20 Claims, 8 Drawing Sheets

(51) Int. Cl.
*G06V 10/82* (2022.01)
*G06V 10/774* (2022.01)

(52) U.S. Cl.
CPC ............ *G06T 2200/24* (2013.01); *G06T 2207/10016* (2013.01); *G06T 2207/10024* (2013.01); *G06T 2207/20076* (2013.01); *G06T 2207/20081* (2013.01); *G06T 2207/20084* (2013.01)

(56) References Cited

U.S. PATENT DOCUMENTS

| | | |
|---|---|---|
| 2012/0306904 A1* | 12/2012 | Francois .................. A63F 13/52 345/589 |
| 2017/0244908 A1 | 8/2017 | Flack et al. |
| 2019/0266015 A1* | 8/2019 | Chandra .................. G06F 9/505 |
| 2019/0355128 A1 | 11/2019 | Grauman et al. |
| 2021/0241500 A1* | 8/2021 | Chen ...................... G06N 20/00 |
| 2021/0350547 A1* | 11/2021 | Nakatani ................... G06T 7/90 |
| 2022/0252857 A1* | 8/2022 | Mori ...................... G06T 3/4053 |
| 2023/0005114 A1* | 1/2023 | Shin ................... G06V 10/7715 |

OTHER PUBLICATIONS

Zeng, Dongdong, et al. "Background subtraction with real-time semantic segmentation." IEEE Access 7 (2019): 153869-153884. (Year: 2019).*

Dec. 3, 20210—(WO) ISR and Written Opinion of the ISA—Application No. PCT/CN2021/120724.

* cited by examiner

COMPUTING PLATFORM USING MACHINE LEARNING FOR FOREGROUND MASK ESTIMATION

BACKGROUND

Aspects of the disclosure relate to processing systems. In particular, aspects of the disclosure relate to processing systems having a machine learning engine and machine learning datasets.

In some instances, foreground masks may be generated to distinguish between foreground (e.g., an individual) and background in images. In many instances, however, to do so, a background clean plate (e.g., a version of the image without the individual) may be necessary to generate a high quality foreground mask. Within the context of video conferencing, the requirement to obtain a background clean plate may be impractical. In order to achieve widespread adoption of background replacement for video conferencing, it may be important to simplify this process. For example, prompting a user to exit the frame in order to calibrate a background clean plate every time there is a change in scene may be impractical and/or result in a poor user experience.

SUMMARY

Aspects of the disclosure provide effective, efficient, scalable, and convenient technical solutions that address and overcome the technical problems associated with using machine learning for foreground mask estimation.

In one or more embodiments of the disclosure described herein, a computing platform including at least one processor, a communication interface, and memory storing computer-readable instructions may receive a set of images and corresponding ground truth foreground masks. Using the set of images and corresponding ground truth foreground masks, the computing platform may train a first neural network to distinguish between image foregrounds and backgrounds, which may result in a first set of foreground masks each corresponding to an image of the set of images. The computing platform may estimate, for each image of the set of images and based on a corresponding foreground mask, a first background clean plate. Using the set of images, the first background clean plates, and a set of corresponding ground truth mask images, the computing platform may train a second neural network, where training the second neural network configures the second neural network to output foreground masks based on video input information. The computing platform may deploy, to an implementation computing device, the second neural network.

In one or more instances, the set of images may represent a target image set for a video recording device being used for video conferencing. In one or more instances, each of the set of images may include red, green, blue (RGB) picture elements or YUV picture elements arranged on a grid along with a predefined width and height.

In one or more instances, the predefined width and height may be based on processing parameters of a target implementation computing device. In one or more instances, the computing platform may train the first neural network using a first subset of the set of images corresponding to a first resolution and a first component configuration and a second subset of the set of images corresponding to a second resolution and a second component configuration.

In one or more instances, the first component configuration and the second component configuration may indicate image components that should be considered part of the foreground and the background for each image of the set of images. In one or more instances, training the first neural network may include associating a foreground mask with each image of the set of images, where the foregrounds masks have the same height and width as their corresponding image, and where the foreground masks include a plurality of pixels each indicating a probability that the corresponding pixel is associated with the foreground of the corresponding image.

In one or more instances, training the first neural network may enable the first neural network to further treat specific components within each image of the set of images as part of the foreground or the background of the corresponding image. In one or more instances, the computing platform may treat the specific components as part of the foreground of the corresponding image by setting the corresponding pixels to indicate a probability of being in the foreground that exceeds a predetermined foreground threshold. The computing platform may treat the specific components as part of the background of the corresponding image by setting the corresponding pixels to indicate a probability of being in the foreground that is less that the predetermined foreground threshold.

In one or more instances, the computing platform may estimate the first background clean plate by replacing, in each image of the set of images, each unknown background pixel that borders at least one known pixel, wherein: the unknown background pixels are pixels marked as having a probability of being in the foreground that exceeds the foreground threshold, and the known background pixels are pixels marked as having a probability of being in the foreground that does not exceed the foreground threshold.

In one or more instances, there might not be a required temporal relationship between subsequent images within the set of images at a time when the first neural network is trained. In one or more instances, the second neural network may include a six channel input image, where a first channel, a second channel, and a third channel correspond to three red green blue (RGB) channels for the set of images, and a fourth channel, a fifth channel, and a sixth channel correspond to three RGB channels for the first background clean plates.

In one or more instances, deploying the second neural network to the implementation computing device may enable the implementation computing device to output the foreground masks based on the video input information.

In one or more instances, the implementation computing device is configured to: 1) input, into the second neural network, each of a plurality of image frames corresponding to the video input information and an initial background clean plate, which results in output of the foreground masks; 2) update, based on the foreground masks, the initial background clean plate; and 3) update, using the updated background clean plate, the second neural network. In one or more instances, the implementation computing device may be configured to detect a background change that exceeds a predetermined background threshold and to reset the updated background plate.

In one or more instances, the foreground masks may be used by an application, hosted by the implementation computing device, to modify a background image corresponding to the video input information. In one or more instances, the implementation computing device may be configured to: 1) select a first processing unit of the implementation computing device on which to apply the second neural network based on available processing capacity for each processing unit of the implementation computing device; and 2) select a second processing unit of the implementation computing device on which to apply the second neural network, where the second processing unit is selected after selecting the first processing unit and based on a determination that: a) processing load on the first processing unit exceeds a predetermined processing threshold, and b) processing load on a second processing unit does not exceed the predetermined processing threshold; and 3) suspend, after selecting the second processing unit, application of the second neural network on the first processing unit.

In one or more instances, wherein the implementation computing device is configured to receive a user input selecting a particular video resolution, and wherein the implementation computing device is configured to select a new version of the second neural network based on the selected video resolution.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further below, a method of estimating a foreground mask for a video sequence using a novel machine learning framework is described herein. The foreground mask may identify pixels in a video frame that are part of the foreground. When dealing with video conferencing applications, the foreground may be defined as the part of an image belonging to a user's face and upper torso. In some instances, foreground masks may be used to remove or obscure parts of video that are not in the foreground (e.g., the background).

To effectively train a machine learning algorithm to identify the foreground masks, a large number of examples generated by human annotators may be provided. These annotators may manually draw outlines around each video frame to identify the foreground, which may be time consuming and/or expensive. To achieve the best results, it may be advantageous to provide a machine learning algorithm with information relating to the parts of an image that are obscured by the foreground. In video processing, this information may be provided by a clean plate or background image. It may be difficult to obtain clean plate information, as it may be obtained by capturing an image both with the subject in the foreground and with the subject out of the video frame. In addition, it may be important that the position of the camera and the lighting in the scene do not change between these two acquisitions.

Described herein is a method of training a high quality foreground mask detector with a limited number of manually annotated examples and without background clean plates. First, a bootstrap convolutional neural network (CNN) is generated that is designed to estimate the foreground of a single image. The initial bootstrap CNN may be used to determine a foreground mask for each frame of a video sequence. A background image may be progressively generated by estimating occluded background pixels from unoccluded neighboring pixels for areas that have been identified as foreground pixels. A foreground mask estimator may be generated that combines image data with background data to generate an improved foreground mask for a video sequence.

In doing so, numerous technical advantages may be realized. For example, high quality foreground masks may be produced for a video sequence using a limited amount of training data. Similarly, by using the pre-training step to estimate an initial foreground mask and an associated background estimation process, backgrounds corresponding to various foreground masks may be virtually filled in without requiring individuals to step in and out of the frame to capture the background.

Further, a major problem that exists today is the need to capture a background clean plate in order to generate high quality foreground masks. This requirement is impractical within the context of video conferencing. In order to achieve widespread adoption of background replacement for video conferencing, the process should be simple and accurate. It may be impractical or otherwise cumbersome to ask the user to step out of a video frame in order to calibrate a background clean plate every time there is a change in the scene. Accordingly, one or more of the methods described herein may remedy this technical deficiency.

Yet an additional technological benefit described herein is that training data may be sourced from individual image sets that might not be part of an image sequence. By removing the constraint that training data should be associated with image sequences, the process of annotating and training neural networks that are capable of dealing with image sequences may be simplified.

Additionally, one or more of the methods described herein obviate the need to determine a background model by using a machine learning approach to calculating a foreground mask. Similarly, one or more of the methods described herein do not require the generation of a trimap (e.g., a partition of an image into three regions: a definite foreground, a definite background, and a blended region where pixels are considered as a mixture of foreground and background colors) for foreground estimation using machine learning. As yet an additional advantage, unknown background images may be represented without requiring a history of background information.

Figure 1A:
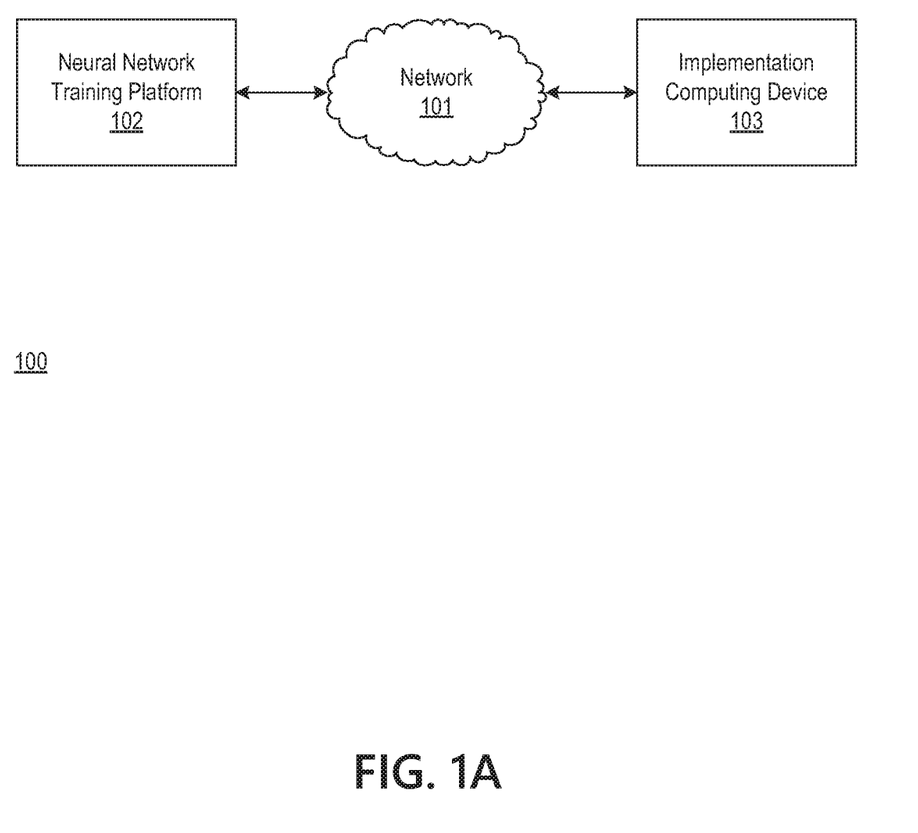
FIGS. 1A-1C depict an illustrative computing environment for applying machine learning for foreground mask estimation in accordance with one or more example embodiments.
Figure 1B:
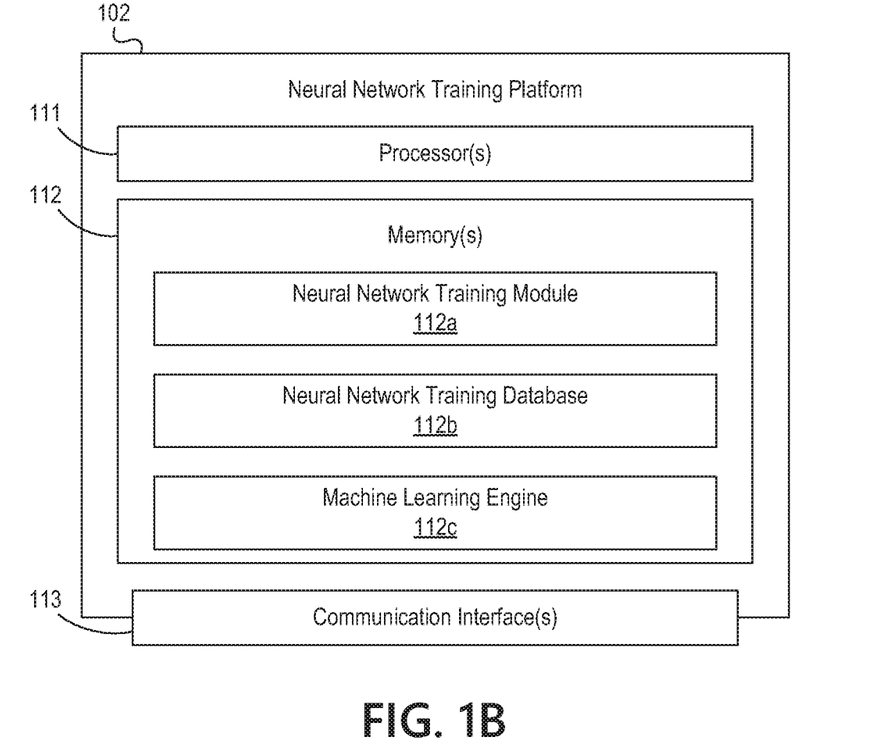
Figure 1C:
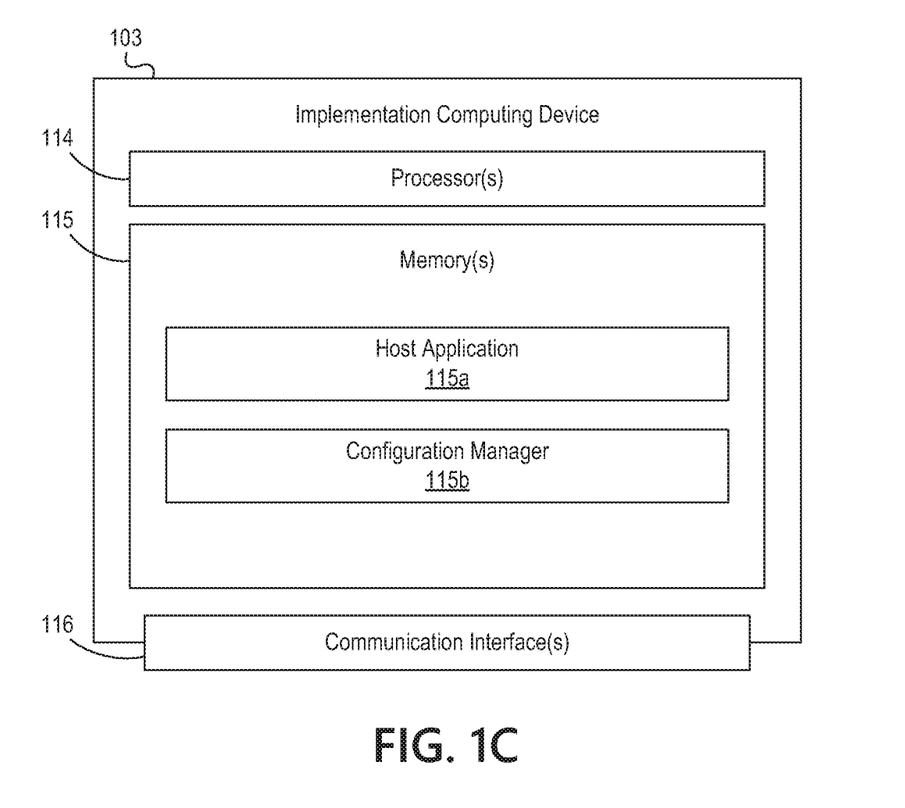

FIGS. 1A-1C depict an illustrative computing environment for applying machine learning for foreground mask estimation in accordance with one or more example embodiments. Referring to FIG. 1A, computing environment 100 may include one or more computer systems. For example, computing environment 100 may include a neural network training platform 102 and an implementation computing device 103.

Neural network training platform 102 may include one or more computers (e.g., cloud based systems, laptop computers, desktop computers, servers, server blades, or the like) and/or other computer components (e.g., processors, memories, communication interfaces). In some instances, neural network training platform 102 may be configured to pre-train one or more first neural network models and to train one or more updated neural network models, which may be deployed to one or more implementation computing devices (e.g., implementation computing device 103, or the like) to perform foreground mask estimation.

Implementation computing device 103 may be a personal computing device (e.g., smartphone, tablet, laptop computer, desktop computer, or the like that may include one or more processors, memories, communication interfaces, storage devices, and/or other components) that may be configured for video communication. For example, the implementation computing device 103 may be configured with a camera, a display, and/or other computing components. The implementation computing device 103 may be configured to host one or more trained neural network models, which may be used to perform foreground mask estimation. In some instances, the implementation computing device 103 may host a configuration manager, which may be used to identify which of the one or more trained neural network models should be applied.

Computing environment 100 also may include one or more networks, which may interconnect one or more of neural network training platform 102, implementation computing device 103, and/or one or more other systems, public networks, sub-networks, and/or the like. For example, computing environment 100 may include a network 101.

In one or more arrangements, neural network training platform 102, implementation computing device 103, and/or the other systems included in computing environment 100 may be any type of computing device capable of displaying a user interface, receiving input via the user interface, and/or communicating the received input to one or more other computing devices. For example, the systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of neural network training platform 102 and/or implementation computing device 103 may, in some instances, be special-purpose computing devices configured to perform specific functions.

Referring to FIG. 1B, neural network training platform 102 may include one or more processors 111, memory 112, and communication interfaces 113. A data bus may interconnect processor 111, memory 112, and communication interface 113. Communication interface 113 (e.g., a transmitted, receiver, or other structural component configured to support communication) may be a network interface configured to support communication between neural network training platform 102 and one or more networks (e.g., network 101, or the like). Memory 112 may include one or more program modules having instructions that when executed by processor 111 cause neural network training platform 102 to perform one or more functions described herein and/or store and/or otherwise maintain information in one or more databases which may be used by such program modules and/or processor 111. In some instances, the one or more program modules and/or databases may be stored by and/or maintained in different memory units of neural network training platform 102 and/or by different computing devices that may form and/or otherwise make up neural network training platform 102. For example, memory 112 may store and/or include a neural network training module 112a, a neural network training database 112b, and a machine learning engine 112c. Neural network training module 112a may have instructions that direct and/or cause neural network training platform 102 to train models for foreground mask estimation accordingly, as discussed in greater detail below. Neural network training database 112b may store information (e.g., images, image properties, or the like) used by neural network training module 112a and/or neural network training platform 102 as a whole in estimating foreground masks and/or in performing other functions. Machine learning engine 112c may have instructions that direct and/or cause the implementation computing device 103 to estimate foreground masks and to set, define, and/or iteratively refine optimization rules, techniques and/or other parameters used by the neural network training platform 102 and/or other systems in computing environment 100.

Referring to FIG. 1C, implementation computing device 103 may include one or more processors 114, memory 115, and communication interfaces 116. A data bus may interconnect processor 114, memory 115, and communication interface 116. Communication interface 116 may be a network interface configured to support communication between implementation computing device 103 and one or more networks (e.g., network 101, or the like). Memory 115 may include one or more program modules having instructions that when executed by processor 114 cause implementation computing device 103 to perform one or more functions described herein and/or store and/or otherwise maintain information in one or more databases which may be used by such program modules and/or processor 114. In some instances, the one or more program modules and/or databases may be stored by and/or maintained in different memory units of implementation computing device 103 and/or by different computing devices that may form and/or otherwise make up implementation computing device 103. For example, memory 115 may store and/or include a host application 115a and a configuration manager 115b. Host application 115a may ingest and process video frames. Configuration manager 115b may select an appropriate computing model, which may target a processing unit of the implementation computing device 103.

Figure 2A:
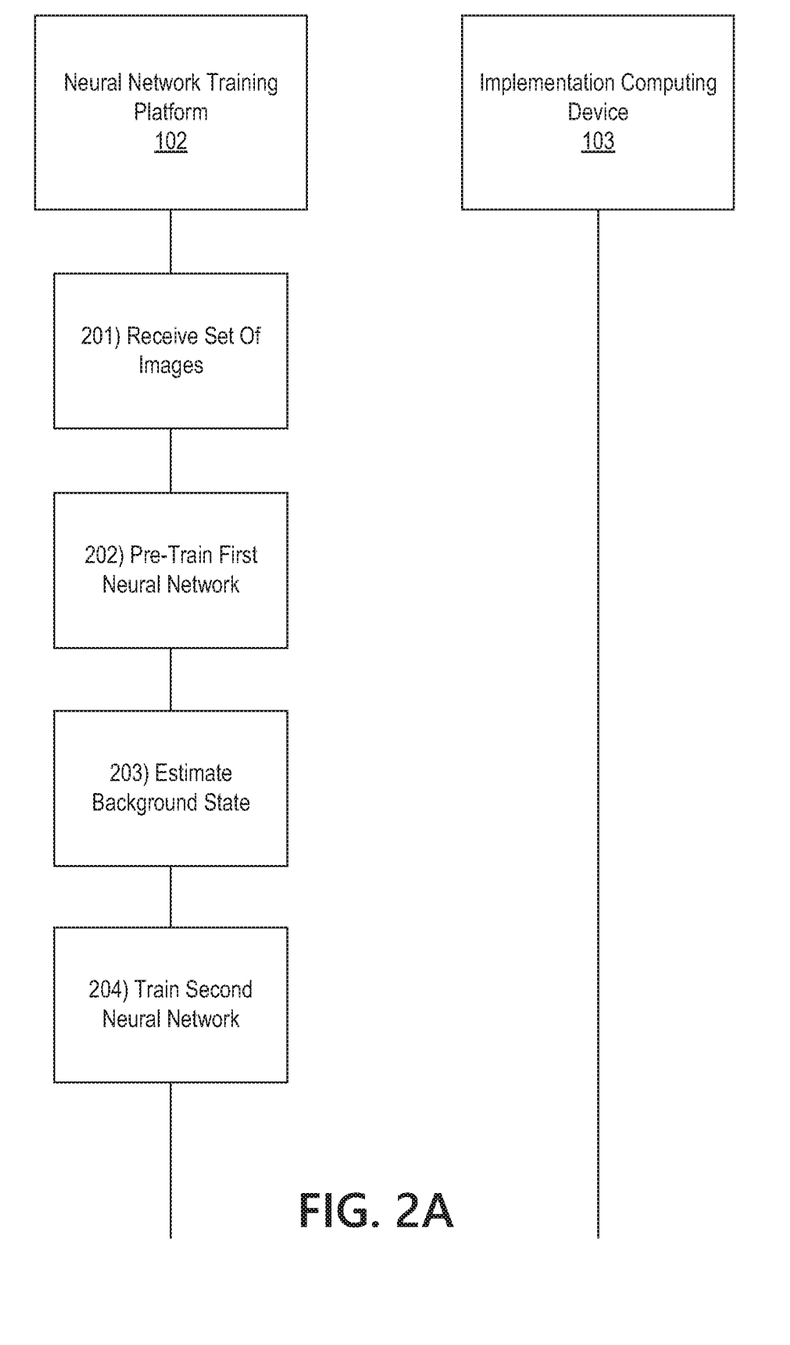
FIGS. 2A-2C depict an illustrative event sequence for applying machine learning for foreground mask estimation in accordance with one or more example embodiments.
Figure 2B:
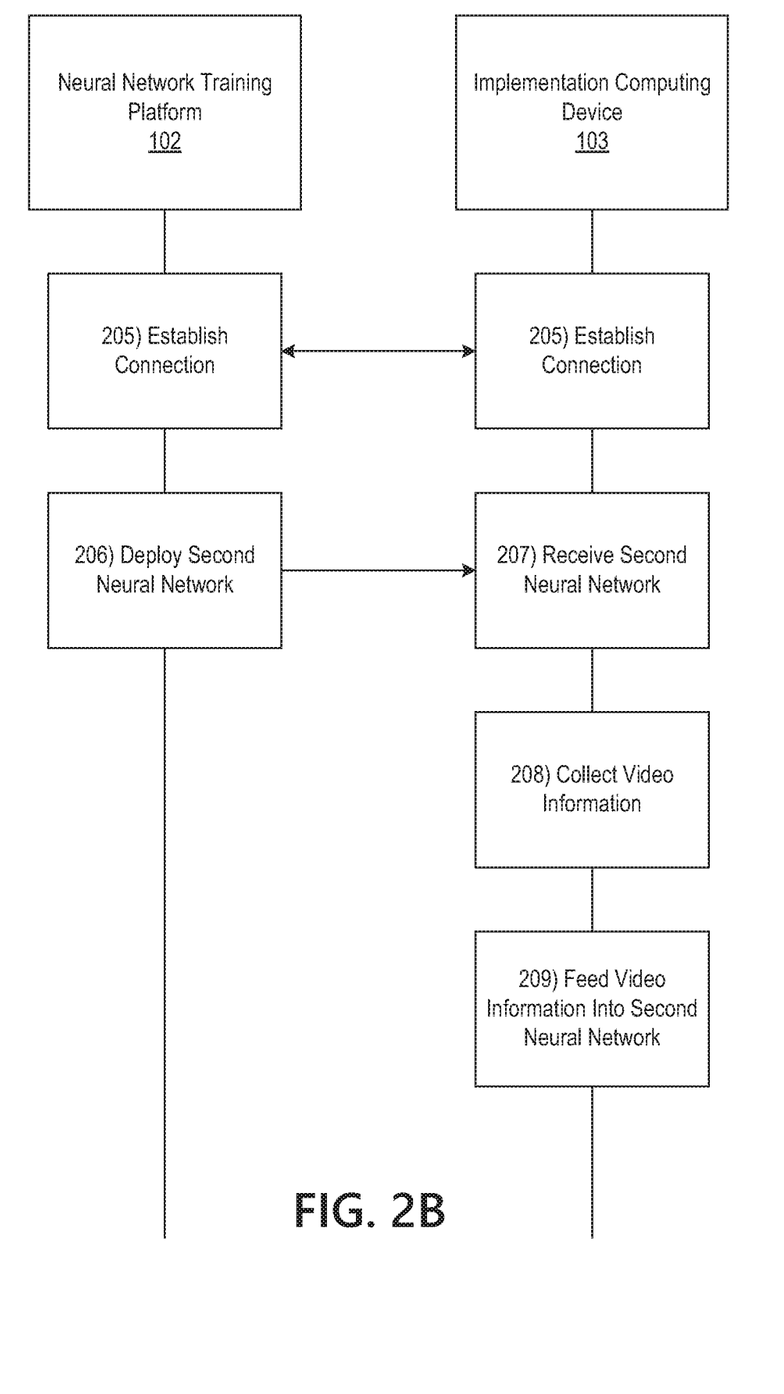
Figure 2C:
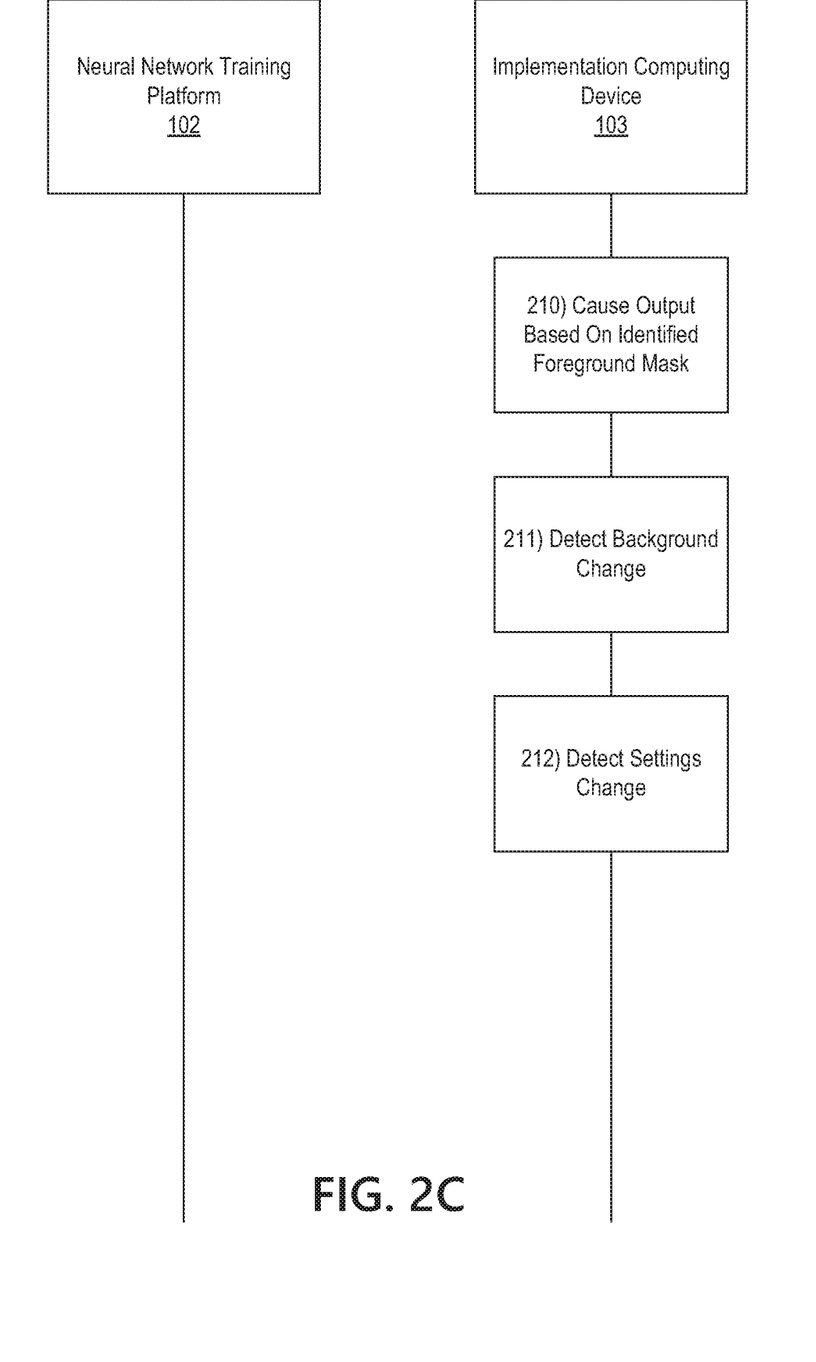

FIGS. 2A-2C depict an illustrative event sequence for applying machine learning to estimate foreground masks in accordance with one or more example embodiments. Referring to FIG. 2A, at step 201, the neural network training platform 102 may receive a set of images along with corresponding ground truth foregrounds masks. For example, the neural network training platform 102 may receive the set of images from one or more computing devices similar to implementation computing device 103 (e.g., cameras, computers, mobile devices, or the like). Additionally or alternatively, the neural network training platform 102 may receive images used to train one or more existing machine learning databases. In some instances, in receiving the set of images, the neural network training platform 102 may receive a set of images representative of a target image set. For example, if the target image set is images from a camera used by an online video conferencing application, the set of images may include the head and shoulders of an individual along with backgrounds that may be typical for office and/or home environments (e.g., bookshelves, windows, curtains, blinds, or other furniture). In some instances, in receiving the set of images, the neural network training platform 102 may receive images that include, for example, individual red, green, blue (RGB) picture elements (pixels) arranged on a grid with a predefined width and/or height (which may be based on, for example, desired image fidelity and/or acceptable performance overhead of the implementation computing device 103 or another target implementation computing device). In some instances, other pixel representation techniques may be used (e.g., a luminance chrominance space such as YUV, or other color space). For example, in instances where a high quality camera is used, resolution may be higher (e.g., 1920×1080, 1280×720, or the like) than in instances where performance overhead of a device (e.g., the implementation computing device 103) is to be minimized (e.g., 320×180, or the like). In some instances, rather than receiving images of a single resolution, the neural network training platform 102 may receive images of a plurality of resolutions that may be used to train the neural network. In receiving the ground truth foreground masks, the neural network training platform 102 may receive, for each image in the set of images, a corresponding mask that obscures the foreground of the corresponding image. For example, if the corresponding image includes an individual's head and shoulders while the individual is sitting in his or her office, the corresponding ground truth foreground mask may be an outline of the individual's head and shoulders that is filled with a solid color (and thus may be used to obscure the individual from the corresponding image so that only that background is visible).

At step 202, once the set of images has been received at step 201, the neural network training platform 102 may train a first neural network. For example, the neural network training platform 102 may train the first neural network, using the set of images and the corresponding ground truth foreground masks, at one or more different resolutions to enable the first neural network to select the most appropriate processing resolution depending on characteristics of the implementation computing device 103. For example, the neural network training platform 102 may train the first neural network at a first resolution (e.g., 320×180), a second resolution (e.g., 380×240), and a third resolution (e.g., 640×480). In these instances where the first neural network is trained on multiple resolutions, a user (e.g., of the implementation computing device 103) may select a resolution that provides the most appropriate quality-performance tradeoff for his or her specific use cases.

To train the first neural network to distinguish between the foreground and background in images, the neural network training platform 102 may associate a set of foreground masks with the set of images. In doing so, the neural network training platform 102 may cause each image in the set of images to be associated with a corresponding foreground mask of the same width and height of the given image, which may result in a first set of foreground masks. As an example, in these instances, each pixel in a foreground mask may indicate the probability that the RGB pixel in the associated image is in the foreground.

In some instances, in training the neural network, the neural network training platform 102 may train a convolutional neural network (CNN) designed for semantic segmentation with two labels (e.g., foreground and background). Additionally or alternatively, the neural network training platform 102 may use additional labels to identify specific components of the foreground. For example, the neural network training platform 102 may train the first neural network to label a chair that an individual is sitting in as either foreground or as background (which may indicate whether or not the chair is ultimately obscured by an artificial background to be imposed). In doing so, the neural network training platform 102 may configure the first neural network to treat various features as either part of the foreground or part of the background. For features that the neural network treats as part of the foreground, the neural network training platform 102 may set the mask pixels associated with the image pixels of the particular features to indicate a high probability (e.g., above a predetermined foreground threshold) of being in the foreground. For example, the predetermined foreground threshold may be a value of 0.9, and the neural network training platform 102 may set the mask pixels to indicate a probability of 0.95 (indicating that the pixels have a 95% change of being in the foreground). For features that the neural network treats as part of the background, the neural network training platform 102 may set the mask pixels associated with the image pixels of the particular features to indicate a low (e.g., below the predetermined foreground threshold) or zero probability of being in the foreground.

In some instances, the neural network training platform 102 may train the initial network with multiple combinations of image resolution and foreground component configurations indicating image components that should be considered part of the foreground and/or the background for each image of the set of images (e.g., should chairs be part of the foreground or the background, or other component configurations) to provide users (e.g., of the implementation computing device 103) with the ability to configure settings according to their preferences.

At step 203, the neural network training platform 102 may use the first neural network, which was pre-trained at step 202, to initiate a background estimation process. In some instances, the neural network training platform 102 may apply the background estimation process to estimate background plates. For example, in estimating a background state, the neural network training platform 102 may generate a clean plate (e.g., an image of the background without inclusion of the foreground such as an individual) of an estimated background with special encoding for unknown values. Additionally or alternatively, the neural network training platform 102 may include additional information in the background plate such as confidence measures, higher dimension information vectors, and/or other relevant information.

To estimate the background plates, the neural network training platform 102 may use the foreground masks generated at step 202 (e.g., the first set of foreground masks) along with the set of images received at step 201 to estimate the state of backgrounds behind their corresponding foreground masks. In some instances, to do so, the neural network training platform 102 may replace unknown background pixels (an unknown background pixel may be a pixel in the set of images that is marked with a probability above the predetermined foreground threshold, and thus might not be in the background, whereas a known background pixel may be a pixel in the set of images that is marked with a probability below the predetermined foreground threshold, and thus is known to be in the background) that border at least one known image pixel with the foreground probability weighted average of a window of known pixels around the unknown background pixel. In some instances, the neural network training platform 102 may allocate a specific pixel value to any unknown background pixels so that they are not included in subsequent training (as described further below). For example, the neural network training platform 102 may set an unknown background pixel to red=128, green=128, blue=128, which may result in a grey value.

In some instances, the set of images and the associated mask set might not be constrained to be part of an image sequence in which there is a temporal relationship between subsequent images, which may be typical of the individual frame of a video conference. However, when the neural network training platform 102 deploys the trained neural network (as described below), this trained neural network may acquire additional information relating to background pixels as previously unseen portions of the background are revealed due to changes in the foreground. For example, an individual in the foreground may move his or her head, which may expose a previously covered portion of the background.

To simulate various background states, the neural network training platform 102 may make various passes over an image. For example, in a first pass, the neural network training platform 102 may update only the background pixels bordering the foreground. In a second pass, the neural network training platform 102 may refer to the pixels calculated in the previous pass as background pixels, and may identify pixels bordering these background pixels. Accordingly, through each pass of an image, the number of unknown background pixels is reduced in each pass until none remain and all of the background pixels contain known (estimated) values. This may result in estimation of a first background clean plate for each image of the set of images.

At step 204, the neural network training platform 102 may train a second neural network using the set of images, the first background clean plates (estimated at step 203), and an associated ground truth mask image set (e.g., black and white images with an individual cut out of the image). In some instances, in training the second neural network, the neural network training platform 102 may train a CNN with a six channel input image (e.g., 3 channels representing the RGB pixel values of each image in the set of images and 3 channels representing the 3 RGB channels from the background clean plates generated at step 203). Additionally or alternatively, the neural network training platform 102 may train the CNN using another color space (e.g., luminance chrominance space such as YUV, or other color space), which may result in performance benefits such as avoiding a color transformation before and after the training. In doing so, the neural network training platform 102 may train the second neural network to output a foreground mask that may be used to remove, replace, and/or modify the background pixels for display.

In some instances, once this second neural network has been trained, it may be used (e.g., by the implementation computing device 103) to process an image sequence in which each image represents an individual frame from the video sequence. Such an image sequence may differ from the set of images received at step 201, in that the images in the image sequence may be sequentially related to each other as frames of a video sequence, whereas the images in the set of images might not be sequentially related to each other, and may simply be used for training purposes. This highlights one of the technological advantages described herein, which is that the neural network may be trained to produce foreground masks for video sequences using training images that are not sequentially or temporally related at the time of training.

Referring to FIG. 2B, at step 205, neural network training platform 102 may establish a connection with implementation computing device 103. For example, the neural network training platform 102 may establish a wireless data connection with implementation computing device 103 to link the neural network training platform 102 to the implementation computing device 103.

At step 206, the neural network training platform 102 may deploy the second neural network to the implementation computing device 103. For example, the neural network training platform 102 may deploy the second neural network to the implementation computing device via the communication interface 113 and while the wireless data connection is established. In some instances, in deploying the second neural network, the neural network training platform 102 may deploy different versions of the second neural network that have each been trained using image information with different settings and/or configurations (e.g., different resolutions, different components to be included in the foreground, different individuals, different lighting, or other parameters). In some instances, by deploying the second neural network to the implementation computing device 103, the neural network training platform 102 may enable the implementation computing device 103 to output foreground masks for streaming video content based on video input information. In some instances, the neural network training platform 102 may deploy the second neural network as part of a video conferencing application, which may be downloaded or otherwise updated by the implementation computing device 103.

At step 207, the implementation computing device 103 may receive the second neural network, deployed at step 206. For example, the implementation computing device 103 may receive the second neural network, sent at step 206, via the communication interface 116 and while the wireless data connection is established. In some instances, in receiving the second neural network, the neural network training platform 102 may receive different versions of the second neural network that have each been trained using image information with different settings and/or configurations (e.g., different resolutions, or other parameters).

In some instances, in receiving the second neural network, the implementation computing device 103 may use the configuration manager 115b to select a processor on which to run the second neural network. For example, the implementation computing device 103 may use the configuration manager 115b to deploy the second neural network on processors with utilization below a predetermined threshold value. For example, the implementation computing device 103 may have a discrete graphics processing unit (GPU) and an embedded GPU, and the discrete GPU may be currently utilized to process a video game (which may include live streaming video). In this example, the embedded GPU may have lower utilization than the discrete GPU, and thus the configuration manager 115b may use the embedded GPU (rather than the discrete GPU) to apply the second neural network (as is described further below). In doing so, the implementation computing device 103 may adapt workload based on available computing resources so as to provide advanced machine learning analysis without adversely affecting overall performance of the implementation computing device 103 (e.g., without reducing framerates in a live stream of the video game).

At step 208, the implementation computing device 103 may collect video information. For example, the implementation computing device 103 may use an embedded or otherwise connected video recording device such as a camera to collect video information corresponding to a live video feed (e.g., video conference, or other video communication service). In some instances, in collecting the video information, the implementation computing device 103 may collect an image sequence.

At step 209, the implementation computing device 103 may feed the image sequence into the second neural network, which may result in output of a foreground mask image. For example, the implementation computing device 103 may initialize a background clean plate with an unknown pixel value (e.g., 128, or another pixel value). The implementation computing device 103 may then combine the background clean plate and the image frames of the image sequence (e.g., one at a time) into a six channel input that may be fed to the second neural network. In some instances, this may result in the implementation computing device 103 outputting a foreground mask image that may be used by the host application 115a to remove, replace, or otherwise modify a background image corresponding to the image sequence/video information depending on user preferences, which may result in an updated background clean plate.

In doing so, the implementation computing device 103 may predict foreground masks that differ from those predicted by the first neural network. To account for such differences, the implementation computing device may retrain the second neural network using the updated background clean plate. In some instances, the implementation computing device 103 may perform this retraining one or more times using updated networks and/or estimated background clean plates until there is convergence.

In some instances, in addition to outputting the foreground mask image, the implementation computing device 103 may continually update a background image corresponding to the image sequence as an individual in the foreground moves (e.g., previously obscured background is exposed as the individual moves his or her head, hands, or the like).

Referring to FIG. 2C, at step 210, the implementation computing device 103 may cause output (e.g., display) of the collected video information while applying the predicted foreground masks. For example, the implementation computing device 103 may use the predicted foreground masks to modify a background image corresponding to the video input information (e.g., to impose a superficial background image behind an individual within a video stream to obscure an actual background of the video stream).

At step 211, the implementation computing device 103 may detect a substantial change in the background (e.g., a change in pixels that exceeds a predetermined background change threshold). For example, the implementation computing device 103 may detect that a light has been turned on or off, a camera has been moved, or other events that may cause a substantial change in the background. In these instances, the implementation computing device may detect this change, and may re-initialize the background model so that all pixels are marked as unknown background pixels, and may return to step 209.

At step 212, the implementation computing device 103 may detect a setting change (e.g., based on system use and/or user preferences). For example, a user may provide an input indicating that a setting relating to resolution, component configuration, active processing units, or other settings should be modified. Additionally or alternatively, the implementation computing device 103 may assess workload on processing units comprising the implementation computing device 103. In these instances, the implementation computing device 103 may use the configuration manager 115b to select a different neural network (e.g., a different version of the second neural network) that is trained with appropriate data, and the process may return to step 209. This may result in analysis of subsequent image frames being performed by the implementation computing device 103 using this other neural network. Additionally or alternatively, the implementation computing device 103 may use the configuration manager 115b to select an alternative processor on which to run the second neural network. For example, the implementation computing device 103 may use the configuration manager 115b to deploy the second neural network (or a different version of the second neural network) on processors with utilization below a predetermined threshold value. For example, the implementation computing device 103 may have a discrete graphics processing unit (GPU) and an embedded GPU, and the discrete GPU may be currently utilized to process a video game. In this example, the embedded GPU may have lower utilization than the discrete GPU, and thus the configuration manager 115b may use the embedded GPU (rather than the discrete GPU) to apply the second neural network. In doing so, the implementation computing device 103 may adapt workload based on available computing resources so as to provide advanced machine learning analysis without adversely affecting overall performance of the implementation computing device 103 (e.g., without reducing framerates in a live stream of the video game).

In some instances, the implementation computing device 103 may use the configuration manager 115b to initially deploy the second neural network (e.g., select the least utilized processing unit at a first time). Additionally or alternatively, the implementation computing device 103 may use the configuration manager 115b to dynamically adjust which processing unit is being used for the second neural network. For example, a first processing unit may have had lower utilization than a second processing unit when the second neural network was initially deployed (and thus the second neural network may have initially been deployed to the first processing unit). However, in this example, once the second neural network has been deployed to the first processing unit, additional load may also be supported by the first processing unit (e.g., a video game may be launched after deployment of the second neural network and may be supported by the first processing unit). In these instances, the configuration manager 115b may identify the increased utilization at the first processing unit, and may adapt workload accordingly (e.g., shift processing of the second neural network to the second processing unit, cause deployment of a different neural network that is configured for application at the second processing unit, and/or otherwise shift workload to the second processing unit). More specifically, the implementation computing device 103 may have initially deployed the second neural network at a first processing unit, and may determine that processing load at the first processing unit now exceeds a processing load threshold. In this example, the implementation computing device 103 may determine that processing load at a second processing unit does not exceed the processing load threshold, and thus may deploy the second neural network (or a different version of the second neural network configured for application on the second processing unit) to the second processing unit and suspend application of the second neural network at the first processing unit.

Accordingly, the methods and systems described above with regard to the illustrative event sequence illustrate at least a method of generating a foreground mask for a video sequence using an estimated background state to provide high quality results using only a limited amount of training data, a method of using a pre-training step to estimate an initial foreground mask an associated background estimation process that is able to virtually fill in the background associated with the foreground mask, and a method of representing background states and updating background images over time.

Figure 3:
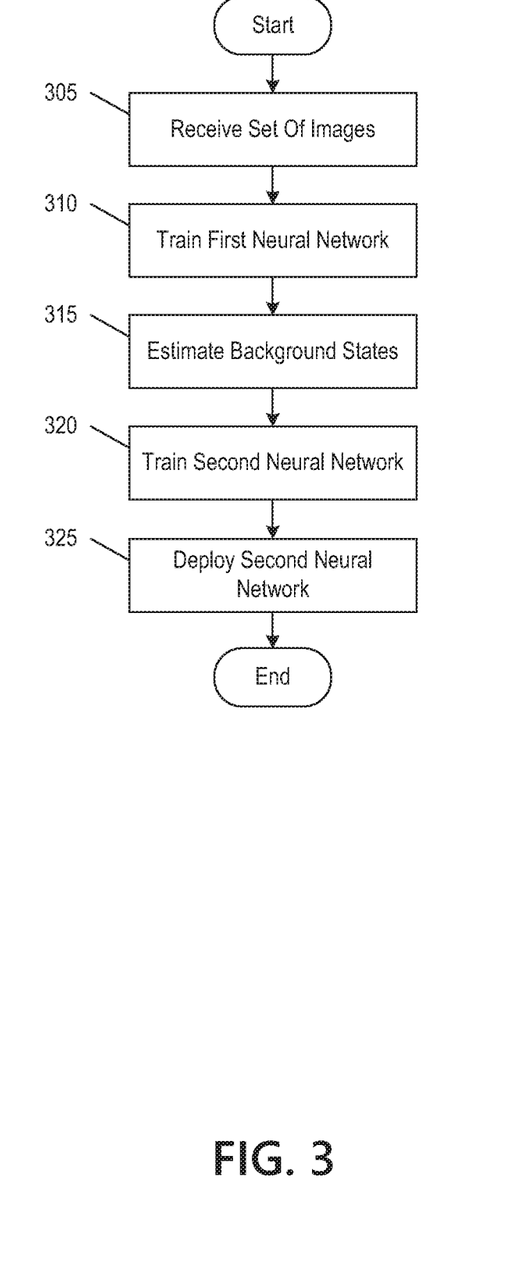
FIGS. 3 and 4 depict illustrative methods for applying machine learning for foreground mask estimation in accordance with one or more example embodiments.

FIG. 3 depicts an illustrative method for foreground mask estimation in accordance with one or more example embodiments. Referring to FIG. 3, at step 305, a computing platform having at least one processor, a communication interface, and a memory may receive a set of images. At step 310, the computing platform may train a first neural network using the set of images. At step 315, the computing platform may use the first neural network to estimate one or more background states. At step 320, the computing platform may train a second neural network using the background states. At step 325, the computing platform may deploy the second neural network to an implementation computing device.

Figure 4:
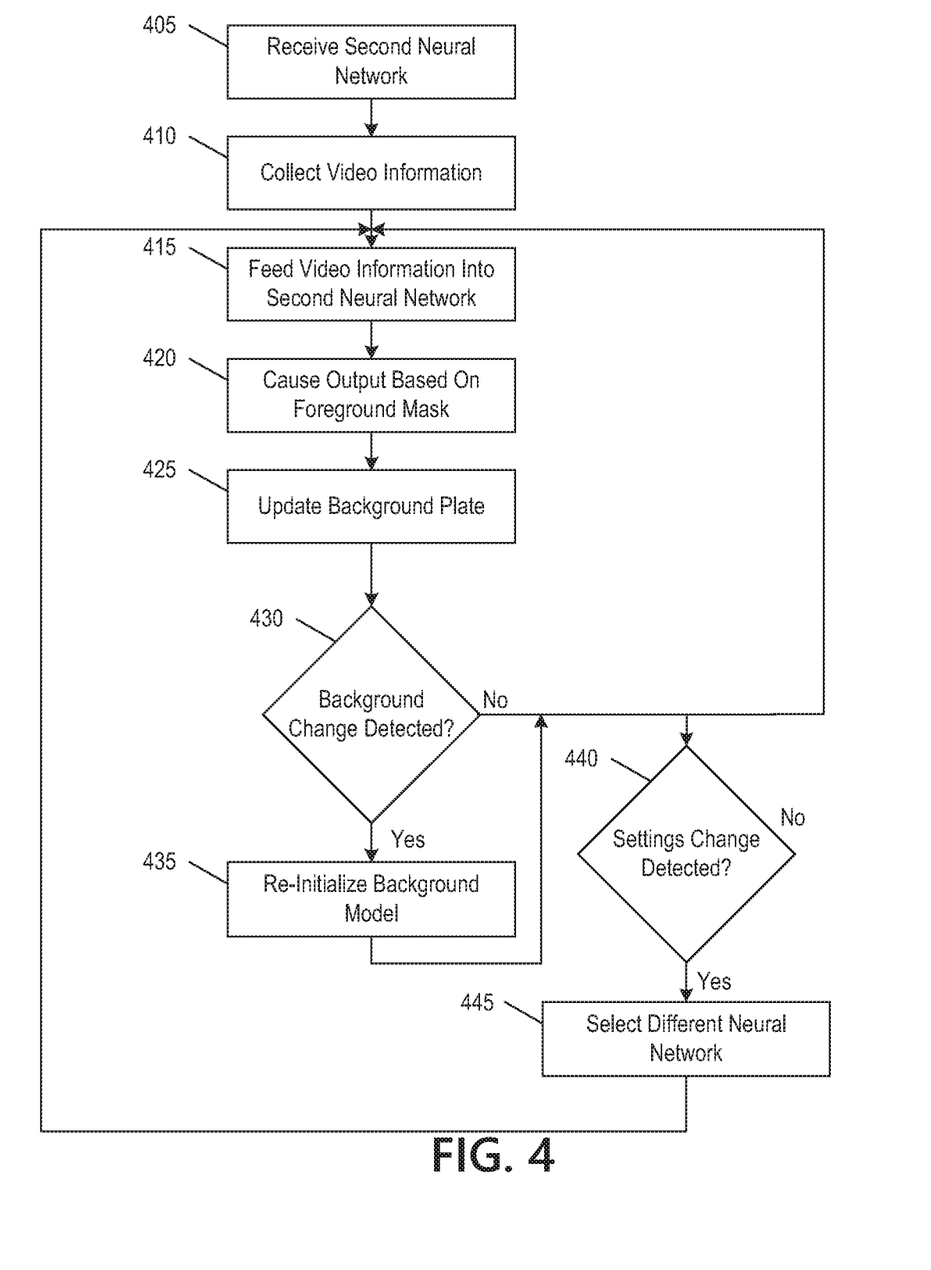

FIG. 4 depicts an illustrative method for foreground mask estimation in accordance with one or more example other embodiments. Referring to FIG. 4, at step 405, a computing device having at least one processor, a communication interface, and a memory may receive the second neural network described in FIG. 3 (e.g., deployed at step 325). At step 410, the computing device may collect video information. At step 415, the computing device may feed the video information into the second neural network to estimate a foreground mask. At step 420, the computing device may cause output of the video content (based on the video information) using the foreground mask. At step 425, the computing device may update a background plate based on the foreground mask. For example, the computing device may use the estimated foreground mask to determine what is in the background of the video content, and may use this information to update an original background clean plate (used by the second neural network to estimate the foreground mask). In doing so, the computing device may progressively construct the background plate over subsequent video frames as portions of the background are revealed by movement of an individual in the foreground of the video content. At step 430, the computing device may determine if a background change is detected. If a background change is detected, the computing device may proceed to step 435. If a background change is not detected, the computing device may proceed to step 440.

At step 435, the computing device may re-initialize a background model used to estimate the foreground mask. At step 440, the computing device may determine if a settings change is detected. If a settings change is detected, the computing device may proceed to step 445. If a settings change is not detected, the computing device may return to step 415. At step 445, the computing device may select a different neural network.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining at least two of software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:

receive a set of images and corresponding ground truth foreground masks;

train, using the set of images and corresponding ground truth foreground masks, a first neural network to distinguish between image foregrounds and backgrounds, wherein training the first neural network results in a first set of foreground masks each corresponding to an image of the set of images, wherein distinguishing between the image foregrounds and the backgrounds comprises separating an identified subject of a video from a corresponding background, and wherein training the first neural network comprises training the first neural network using a first subset of the set of images corresponding to a first resolution and a first component configuration and a second subset of the set of images corresponding to a second resolution and a second component configuration;

estimate, for each image of the set of images and based on the foreground mask inferred by the first neural network, and images from a sequence temporarily related to the image, a first background clean plate;

train, using the set of images, the first background clean plates, and a set of corresponding ground truth mask images, a second neural network, wherein training the second neural network configures the second neural network to output foreground masks based on video input information; and deploy, to an implementation computing device, the second neural network.

2. The computing platform of claim 1, wherein each of the set of images comprises YUV picture elements arranged on a grid along with a predefined width and height.

3. The computing platform of claim 2, wherein the predefined width and height are based on processing parameters of a target implementation computing device.

4. The computing platform of claim 1, wherein the first component configuration and the second component configuration indicate image components that should be considered part of the foreground and the background for each image of the set of images.

5. The computing platform of claim 1, wherein training the first neural network comprises associating a foreground mask with each image of the set of images, wherein the foregrounds masks have the same height and width as their corresponding image, and wherein the foreground masks comprise a plurality of pixels each indicating a probability that the corresponding pixel is associated with the foreground of the corresponding image.

6. The computing platform of claim 5, wherein training the first neural network enables the first neural network to further treat specific components within each image of the set of images as part of the foreground or the background of the corresponding image.

7. The computing platform of claim 6, wherein:
treating the specific components as part of the foreground of the corresponding image comprises setting the corresponding pixels to indicate a probability of being in the foreground that exceeds a predetermined foreground threshold, and
treating the specific components as part of the background of the corresponding image comprises setting the corresponding pixels to indicate a probability of being in the foreground that is less that the predetermined foreground threshold.

8. The computing platform of claim 7, wherein estimating the first background clean plate comprises:
replacing, in each image of the set of images, each unknown background pixel that borders at least one known pixel, wherein:
the unknown background pixels are pixels marked as having a probability of being in the foreground that exceeds the foreground threshold, and
the known background pixels are pixels marked as having a probability of being in the foreground that does not exceed the foreground threshold.

9. The computing platform of claim 1, wherein there is not a required temporal relationship between subsequent images within the set of images at a time when the first neural network is trained.

10. The computing platform of claim 1, wherein the second neural network comprises a six channel input image, wherein:
a first channel, a second channel, and a third channel correspond to three red green blue (RGB) channels for the set of images, and
a fourth channel, a fifth channel, and a sixth channel correspond to three RGB channels for the first background clean plates.

11. The computing platform of claim 1, wherein deploying the second neural network to the implementation computing device enables the implementation computing device to output the foreground masks based on the video input information.

12. The computing platform of claim 1, wherein the implementation computing device is configured to:
input, into the second neural network, each of a plurality of image frames corresponding to the video input information and an initial background clean plate, and wherein inputting each of the plurality of image frames corresponding to the video input information and the initial background clean plate into the second neural network results in output of the foreground masks;
update, based on the foreground masks, the initial background clean plate; and
update, using the updated background clean plate, the second neural network.

13. The computing platform of claim 12, wherein the implementation computing device is configured to detect a background change that exceeds a predetermined background threshold and to reset the updated background plate.

14. The computing platform of claim 1, wherein the implementation computing device is configured to:
select a first processing unit of the implementation computing device on which to apply the second neural network based on available processing capacity for each processing unit of the implementation computing device; and
select a second processing unit of the implementation computing device on which to apply the second neural network, wherein the second processing unit is selected after selecting the first processing unit and based on a determination that:
processing load on the first processing unit exceeds a predetermined processing threshold, and
processing load on a second processing unit does not exceed the predetermined processing threshold; and
suspend, after selecting the second processing unit, application of the second neural network on the first processing unit.

15. The computing platform of claim 1, wherein the implementation computing device is configured to receive a user input selecting a particular video resolution, and wherein the implementation computing device is configured to select a new version of the second neural network based on the selected video resolution.

16. The computing platform of claim 1, where the second neural network is configured to output the foreground masks based on the video input information without capturing a corresponding background clean plate.

17. The computing platform of claim 1, wherein the second neural network is configured to output the foreground masks regardless of whether or not the identified subject is moving, wherein the identified subject comprises a human subject.

18. The computing platform of claim 1, wherein the second neural network is configured to distinguish between a foreground corresponding to the identified subject and moving objects that are not in the foreground.

19. A method, comprising:
at a computing platform comprising at least one processor, a communication interface, and memory:
receiving a set of images and corresponding ground truth foreground masks;
training, using the set of images and corresponding ground truth foreground masks, a first neural network to distinguish between image foregrounds and backgrounds, wherein training the first neural network results in a first set of foreground masks each corresponding to an image of the set of images, wherein distinguishing between the image foregrounds and the backgrounds comprises separating an identified subject of a video from a corresponding background, and wherein training the first neural network comprises training the first neural network using a first subset of the set of images corresponding to a first resolution and a first component configuration and a second subset of the set of images corresponding to a second resolution and a second component configuration;
estimating, for each image of the set of images and based on a corresponding foreground mask, a first background clean plate;
training, using the set of images, the first background clean plates, and a set of corresponding ground truth mask images, a second neural network, wherein training the second neural network configures the second neural network to output foreground masks based on video input information; and
deploying, to an implementation computing device, the second neural network.

20. One or more non-transitory computer-readable media storing instructions that, when executed by a computing platform comprising at least one processor, a communication interface, and memory, cause the computing platform to:
receive a set of images and corresponding ground truth foreground masks;
train, using the set of images and corresponding ground truth foreground masks, a first neural network to distinguish between image foregrounds and backgrounds, wherein training the first neural network results in a first set of foreground masks each corresponding to an image of the set of images, wherein distinguishing between the image foregrounds and the backgrounds comprises separating an identified subject of a video from a corresponding background, and wherein training the first neural network comprises training the first neural network using a first subset of the set of images corresponding to a first resolution and a first component configuration and a second subset of the set of images corresponding to a second resolution and a second component configuration;
estimate, for each image of the set of images and based on a corresponding foreground mask, a first background clean plate;
train, using the set of images, the first background clean plates, and a set of corresponding ground truth mask images, a second neural network, wherein training the second neural network configures the second neural network to output foreground masks based on video input information; and
deploy, to an implementation computing device, the second neural network.

* * * * *